US007509799B2

(12) United States Patent
Amou et al.

(10) Patent No.: US 7,509,799 B2
(45) Date of Patent: Mar. 31, 2009

(54) ENGINE EXHAUST GAS TREATMENT SYSTEM AND EXHAUST GAS TREATMENT PROCESS

(75) Inventors: Kiyoshi Amou, Chiyoda (JP); Makoto Yamakado, Tsuchiura (JP); Hiroshi Kusumoto, Tsuchiura (JP); Masami Nagano, Hitachinaka (JP); Ikuhisa Hamada, Tokyo (JP); Toshifumi Mukai, Kure (JP); Hiroshi Yokota, Shonan (JP)

(73) Assignees: Hitachi High-Technologies Corporation, Tokyo (JP); Babcock-Hitachi K.K., Tokyo (JP)

( * ) Notice: Subject to any disclaimer, the term of this patent is extended or adjusted under 35 U.S.C. 154(b) by 387 days.

(21) Appl. No.: 10/854,757

(22) Filed: May 27, 2004

(65) Prior Publication Data

US 2005/0013756 A1    Jan. 20, 2005

(30) Foreign Application Priority Data

May 28, 2003    (JP)    ............................. 2003-150775

(51) Int. Cl.
    *F01N 3/00*    (2006.01)
(52) U.S. Cl. .............................. 60/286; 60/287; 60/288; 60/295; 60/301; 60/303
(58) Field of Classification Search ........... 60/286–288, 60/295, 301, 303
    See application file for complete search history.

(56) References Cited

U.S. PATENT DOCUMENTS

| 5,601,792 A |   | 2/1997 | Hug et al. |
| 5,992,141 A | * | 11/1999 | Berriman et al. ............... 60/274 |
| 6,173,568 B1 | * | 1/2001 | Zurbig et al. .................. 60/286 |
| 6,401,455 B1 | * | 6/2002 | Mathes et al. ................. 60/286 |
| 6,516,610 B2 | * | 2/2003 | Hodgson ....................... 60/286 |

(Continued)

FOREIGN PATENT DOCUMENTS

DE    420514    10/1925

(Continued)

OTHER PUBLICATIONS

Matsuo Odaka, "Challenge for Ultra Low Emission Diesel Engine", Journal of the Japan Society of Mechanical Engineers, 10, 2002, Vo. 105, No. 1007, p. 23.

(Continued)

*Primary Examiner*—Thomas E Denion
*Assistant Examiner*—Diem Tran
(74) *Attorney, Agent, or Firm*—Crowell & Moring LLP

(57) ABSTRACT

To provide an engine exhaust gas treatment system that can efficiently reduce and remove NOx using easy-to-handle urea as the reducing agent, regardless of the engine operating conditions. An exhaust gas denitration system in which an exhaust gas is introduced into the denitration catalyst reactor 5 provided in the exhaust gas flue 3, where NOx is reduced and removed in the presence of the denitrati on catalyst, wherein a diversion means provided in the exhaust gas flue 3 introduces part or all of the exhaust gas into a urea solution injection evaporator having a heating means by the heater 30, and the heat from the exhaust gas and the heat from the heater serve to generate ammonia that is then circled and mixed with the exhaust gas and introduced into the denitration catalyst reactor 4.

10 Claims, 8 Drawing Sheets

U.S. PATENT DOCUMENTS

| | | | |
|---|---|---|---|
| 6,601,385 B2 * | 8/2003 | Verdegan et al. | 60/286 |
| 6,722,123 B2 * | 4/2004 | Liu et al. | 60/286 |
| 6,871,490 B2 * | 3/2005 | Liang et al. | 60/286 |
| 7,065,958 B2 * | 6/2006 | Funk et al. | 60/286 |
| 2002/0108368 A1 | 8/2002 | Hodgson | |

FOREIGN PATENT DOCUMENTS

| | | | |
|---|---|---|---|
| DE | 19855385 | * | 6/2000 |
| DE | 19913462 A1 | | 9/2000 |
| JP | 2002-89241 | | 3/2002 |
| JP | 2002-161732 | | 6/2002 |
| JP | 2002-332827 | | 11/2002 |
| WO | WO 98/22209 | | 5/1998 |
| WO | WO 98/42623 | | 10/1998 |
| WO | WO 02/43837 A1 | | 6/2002 |

OTHER PUBLICATIONS

Manfred Koebel et al., "Thermal and Hydrolytic Decomposition of Urea for Automotive Selective Catalytic Reduction Systems: Thermochemical and Practical Aspects", Ind. Eng. Chem. Res 2003, 42, pp. 2093-2100, Apr. 10, 2003.

* cited by examiner

ENGINE EXHAUST GAS TREATMENT SYSTEM AND EXHAUST GAS TREATMENT PROCESS

DETAILED DESCRIPTION OF THE INVENTION

1. Field of the Invention

The present invention relates to an exhaust gas treatment system and treatment process there of, and more particularly, to an exhaust gas treatment system and process which use urea as a reducing agent and can efficiently remove nitrogen oxide in the exhaust gas even in a low temperature region.

2. Prior Art

Nitrogen oxide (hereinafter referred to as NOx) included in the exhaust gas emitted from the diesel engines used in vehicles such as a heavy truck and a bus is a material that can cause photochemical smog. Effluent control of NOx that is to be enhanced for these vehicles urgently needs the installation of an exhaust gas denitration system.

One of the removal (denitration) methods considered is to use nontoxic urea as the reducing agent to make it possible to reduce NOx highly efficiently. For example, an exhaust gas cleaning system is provided that utilizes a urea solution as the reducing agent, and includes a NOx reduction catalyst provided in the exhaust pipe to make it possible to obtain a high rate of NOx reduction even in a relatively low temperature region, and is configured to add the urea solution as the reducing agent upstream of NOx reduction catalyst.

In this system, a urea decomposition catalyst is provided between two positions in the longitudinal direction of the exhaust pipe, the position where the urea solution is added and the posit ion where NOx reduction catalyst is provided. This pre-step urea decomposing catalyst can decompose the urea solution into ammonia and carbon dioxide.

The ammonia thus obtained is highly reactive with NOx and enables efficient execution of reduction treatment of NOx to make it possible to reduce and clean NOx in a relatively lower temperature region than for the direct reaction of the urea solution with NOx (see, for example, Japanese Application Patent Laid-open Publication No. 2002-161732 (pp. 2-4, FIG. 1)).

Japanese Application Patent Laid-open Publication No. 2002-89241 describes a denitration system that includes a denitration catalyst in the exhaust gas pipe of the internal combustion engine, and that introduces a reducing agent into the pipe to add the agent in the exhaust gas and then brings the exhaust gas into contact with the denitration catalyst, thereby denitrating the exhaust gas.

This system comprises a reactor, which can store urea in solid state and zeolite together, a heating means for heating the reactor, and a water vessel for storing water. The water vessel introduces the water into the reactor, while the heating means heats the reactor to hydrolyze the urea into ammonia gas that is added into the exhaust gas as the reducing agent.

Also known is a disclosure of Japanese Application Patent Laid-open Publication No. 2002-332827.

A urea SCR system is known as the exhaust gas cleaning system that includes no urea decomposition catalyst of the exhaust gas cleaning system described above (see, for example, Matsuo Odaka, "Challenge for Ultra Low Emission Diesel Engine," Journal of the Japan Society of Mechanical Engineers, 2002.10, Vol. 105, No. 1007, p. 23).

<Problems to be Solved by the Invention>

The first conventional technique (Japanese Application Patent Laid-open Publication No. 2002-161732) provides the urea decomposition catalyst between the position where the urea solution is added and the position where the NOx reduction catalyst is provided and adds (injects) directly the urea solution on the urea decomposition catalyst. The urea decomposition catalyst can thus decompose the urea solution into ammonia and carbon dioxide, and the ammonia from decomposition can then react with NOx on the NOx reduction catalyst to denitrate the NOx efficiently.

It is difficult, however, to disperse and supply directly and uniformly the urea solution onto the urea decomposition catalyst. It may also take a relatively long time for the urea decomposition catalyst to decompose the urea solution. From these, it is preferable to help mix the urea solution with the exhaust gas to evaporate it. The mixture can then be provided onto the urea decomposition catalyst in urea vapor or the like.

One way for this is to ensure a predetermined distance between the injection nozzle and the urea decomposition catalyst in such a way that the exhaust heat of the exhaust gas can heat and help evaporate the urea solution before the solution reaches the urea decomposition catalyst. The evaporation of the urea-solution spray injected, however, needs a flue length of, for example, about 1.5 m for a urea solution spray with a droplet diameter of about 100 µm, and needs a flue length of about 6.2 m for a droplet diameter of about 200 µm. This may cause a large system that is unsuitable for automobile use.

The above-described way to obtain an amount of heat from the exhaust heat of the exhaust gas for the evaporation may be effective in view of high exhaust gas temperatures generating a large amount of NOx that needs more urea solution. At the startup of the engine, however, this way can achieve insufficient efficiency of evaporation due to lower temperatures and a smaller amount of the exhaust gas. It is thus difficult to efficiently reduce and clean NOx at lower temperatures such as at the startup.

The second conventional technique (Japanese Application Patent Laid-open Publication No. 2002-89241) is an exhaust gas treatment system that evaporates the urea solution and uses ammonia from the hydrolysis as the reducing agent for the denitration catalyst reaction. If this exhaust gas treatment system is applied to vehicles with diesel engines such as a heavy truck and bus, the evaporation and hydrolysis of the maximum required amount of the urea solution (50 cc/min, 32.5 wt %, 25° C.) needs about 2.4 kW of the minimum required amount of heat. It is difficult to obtain such an amount of power from the automobile battery.

SUMMARY OF THE INVENTION

<Object>

It is an object of the present invention to provide an exhaust gas treatment system and an exhaust gas treatment process suitable for an automobile use, which can remove NOx, and use as the reducing agent easy-to-handle materials such as urea, and can respond to the whole operating area from an area with low temperatures and a small amount of exhaust gas, such as at the startup, to a full load area with high temperatures and a large amount of exhaust gas, and has a compact structure, good response, and low power consumption, <Means for Solving the Problems>

The present invention achieves the above-described objects, generally according to the following concepts.

The urea solution is atomized and the exhaust gas is used as the carrier gas.

The heater evaporates the urea solution in the operating area with relatively a smaller amount and lower temperatures of the exhaust gas such as at the startup of the diesel engine. Because smaller amount of NOx is generated in this operating area, less urea solution is to be treated and the heater can have the minimum required capacity and power consumption.

The heat from the exhaust gas is used to make it possible to evaporate a plenty of urea solution, in case of higher temperatures of the exhaust gas and a plenty of NOx generation.

The urea solution and exhaust gas are circled and more than one restriction is provided in the flue and evaporator passage to effectively exchange heat between the urea solution and exhaust gas and mix the urea solution with exhaust gas in a space-saving manner.

An exhaust gas diversion means is provided to make it possible to supply the exhaust gas onto the denitration catalyst over the shortest distance to warm up the denitration catalyst in the shortest time, in the operating area with relatively a smaller amount and lower temperatures of the exhaust gas such as at the startup of the diesel engine.

The present invention can thus be illustrated as follows.

(1) An exhaust gas treatment system and process in which an exhaust gas is introduced into a denitration catalyst reactor provided in an exhaust gas flue, where nitrogen oxide is reduced and removed in the presence of the denitration catalyst, comprising: an exhaust gas diversion means in the exhaust gas flue; a urea solution injection evaporator including a urea solution injection valve for injecting a urea solution into part or all of the exhaust gas introduced by the above-described diversion means and an evaporation mixer; a heating means by a heater; a mixing means for decomposing particulate droplets of the urea solution and urea by one or both of heat from the exhaust gas and heat from the heater, and for mixing the generated ammonia with the exhaust gas; and a mixed gas introduction portion for introducing the above-described mixed gas into the denitration catalyst reactor, wherein the above-described ammonia is used as the reducing agent for the denitration catalyst reaction.

The urea solution injection valve may be replaced with a liquid reducing agent injection device for injecting a liquid reducing agent of the urea solution and hydrocarbon (HC).

(2) An exhaust gas treatment system and process according to the above-described (1), wherein the above-described exhaust gas diversion means changes the diversion amount into the urea solution injection evaporator depending on output from part or all of an exhaust gas temperature sensor, an exhaust gas flow rate sensor, and a nitrogen oxide sensor.

(3) An exhaust gas treatment system and process according to the above-described (1) or (2), wherein the above-described urea solution injection device changes the amount of the urea solution injected depending on output from part or all of an exhaust gas temperature sensor, an exhaust gas flow rate sensor, and a nitrogen oxide sensor.

(4) An exhaust gas treatment system and process according to the above-described (3), wherein the above-described heater changes the amount of heat generated depending on output from part or all of an exhaust gas temperature sensor, an exhaust gas flow rate sensor, and a nitrogen oxide sensor.

(5) An exhaust gas treatment system and process according to the above-described (3), wherein the above-described heater changes the amount of heat generated according to a previously stored heat generation pattern depending on an engine operating condition.

(6) An exhaust gas treatment system and process according to the above-described (4), wherein the above-described heater generates a smaller amount of heat for higher temperatures and a greater flow rate of the exhaust gas.

(7) An exhaust gas treatment system and process according to the above described (1)-(6), wherein the above-described mixing means mixes the particulate droplets of the urea solution and ammonia with the exhaust gas by circling them.

(8) An exhaust gas treatment system and process according to the above described (1)-(7), wherein a plurality of restrictions are provided in the flue and evaporator passage through which the particulate droplets of the urea solution, ammonia, and exhaust gas pass, for an extended dwell time of the particulate droplets.

(9) An exhaust gas treatment system and process according to the above-described (7) and (8), wherein a urea decomposition catalyst reactor is provided in the connection between the above-described mixed gas introduction portion and exhaust gas flue.

(10) An exhaust gas treatment system and process according to the above-described (9), wherein the above-described urea decomposition catalyst uses a metal oxide or metal oxide composite as its active ingredient.

DESCRIPTION OF THE PREFERRED EMBODIMENTS

The present invention will be described below with reference to the drawings and embodiments.

Figure 1:
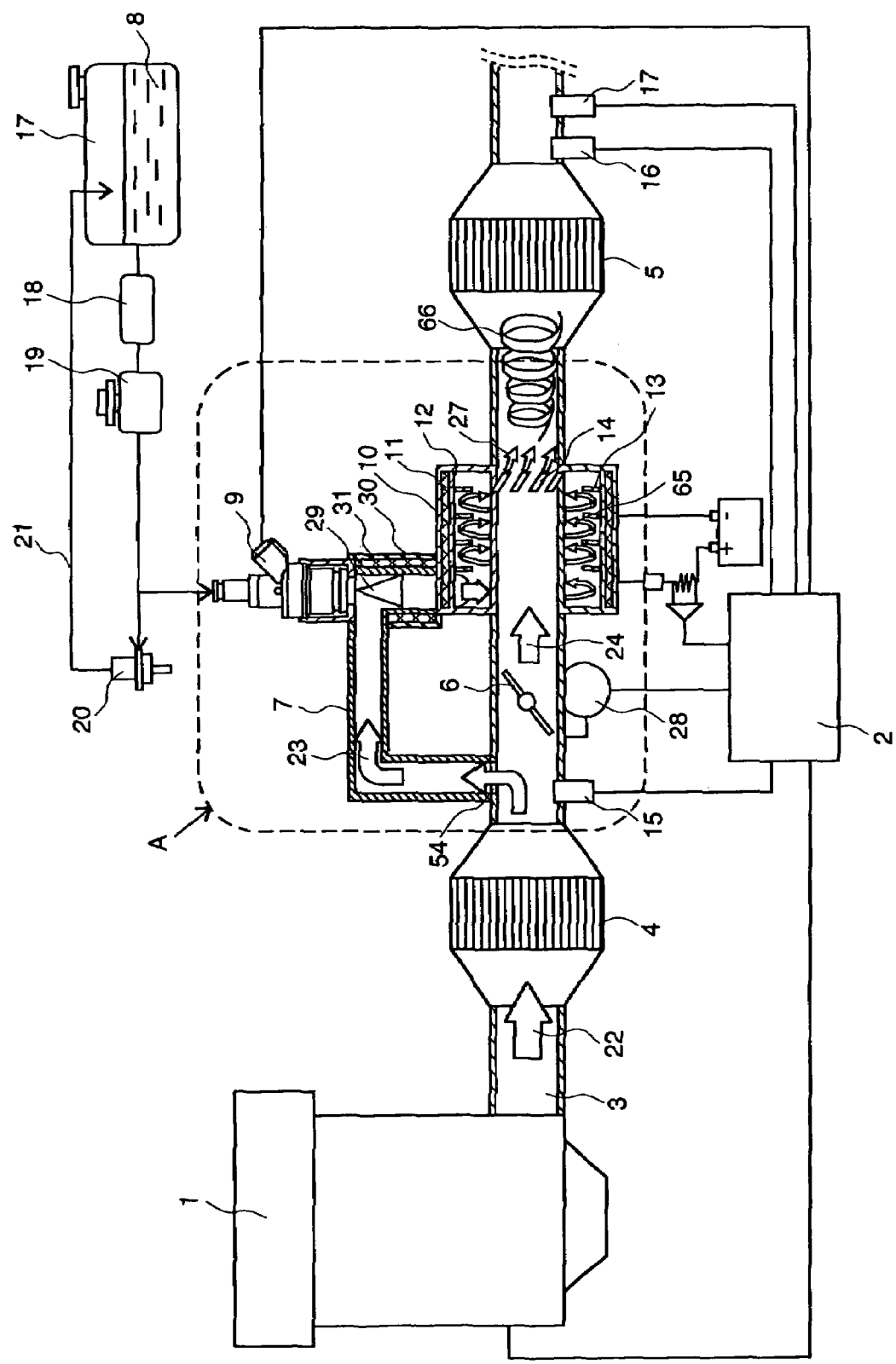
FIG. 1 shows an engine exhaust gas treatment system of the first embodiment according to the present invention.

The first embodiment according to the present invention will now be described with reference to FIGS. 1 and 2. FIG. 1 shows the overall configuration of the exhaust gas treatment system of an embodiment according to the present invention. The diesel engine 1 determines the fuel injection amount and injection timing based on various signals that are input to the ECU (Electric Control Unit) 2. The diesel engine also has a not-shown EGR (exhaust gas recirculation) valve and an intake throttle that is used together with the EGR valve to expand the control region of the EGR rate.

DPF (Diesel Particulate Filter) 4, which is a diesel particulate removal device, resides in the flue 3 that is an exhaust passage of the exhaust gas 22 emitted from the diesel engine 1. Downstream of the DPF, a denitration catalyst (SCR: Selective Catalytic Reduction: selective reduction type NOx catalyst) 5 (denitration catalyst reactor) resides. Further downstream of the SCR, a not-shown muffler and the like reside. An exhaust flow control valve 6 resides in the flue 3 between the DPF 4 and denitration catalyst 5.

A valve drive unit 28 controls the open/close of the exhaust flow control valve 6 using the control signals from the ECU 2 based on signals from sensors such as an exhaust gas temperature sensor 15, a NOx sensor 16, and an $NH_3$ sensor, according to the operating condition of the diesel engine 1. A diversion pipe 7, which is an exhaust gas diversion passage, connects to the flue 3 between the DPF 4 and exhaust flow control valve 6. The diversion pipe 7 has a urea solution injection valve 9 for injecting and supplying the urea solution spray 29 into the diversion pipe 7.

A heater 30 as a heating means resides outside the diversion pipe 7 downstream of the urea solution injection valve 9.

This can make up an ammonia generation portion for generating ammonia by decomposing the particulate droplets of the injected urea solution and urea. The exhaust gas that flows during the ammonia generation will mix with the ammonia. A thermal insulation member 31 resides outside the heater 30 for improving the thermal insulation to the ambient air.

Downstream of the heater 30, an evaporation mixer 10 resides outside the flue 3 in a ring shape at a predetermined height from the flue 3 with a length in the axial flow direction of the flue 3. Another heater 11 resides outside the evaporation mixer 10 which can heat the inner surface (heating surface) of the evaporation mixer depending upon a predetermined operating condition.

A thermal insulation member 56 resides outside the heater 11 for improving the thermal insulation to the ambient air. This can make up another ammonia generation portion for generating ammonia by decomposing the particulate droplets of residual urea solution and urea. More than one restriction 13 in a ring shape resides on the heating surface 12 that is the inner surface of the evaporation mixer 10.

The restrictions 13 can change the cross section area of the evaporation mixer 10 passage along the axial flow direction. Downstream of the evaporation mixer 10, an evaporation mixer outlet 14 resides which communicates with the flue 3 downstream of the exhaust flow control valve 6.

The flue 3 contains various sensors such as the exhaust gas temperature sensor 15, NOx sensor 16, $NH_3$ sensor 17, and not-shown engine crank angle sensor. These sensors can keep track of the operating conditions of the diesel engine 1 or the like so that the ECU 2 can set the optimum opening of the exhaust flow control valve 6 to control the exhaust gas diversion ratio for flows into the flue 3 and diversion pipe 7.

The ECU 2 can also control the setting temperature of the heaters 11, 30 and injection amount from the urea solution injection valve 9 or the like. The urea solution 8 stored in the urea solution tank 17 is supplied through the filter 18 and pump 19 to the urea solution injection valve 9.

A regulator 20 can adjust the urea solution supply pressure to the urea solution injection valve 9 at a predetermined urea solution supply pressure. The return urea solution 8 from the regulator 20 flows into the urea solution tank 17. A pipe 21 connects the above-described urea solution tank 17, filter 18, pump 19 and regulator 20.

Figure 2:
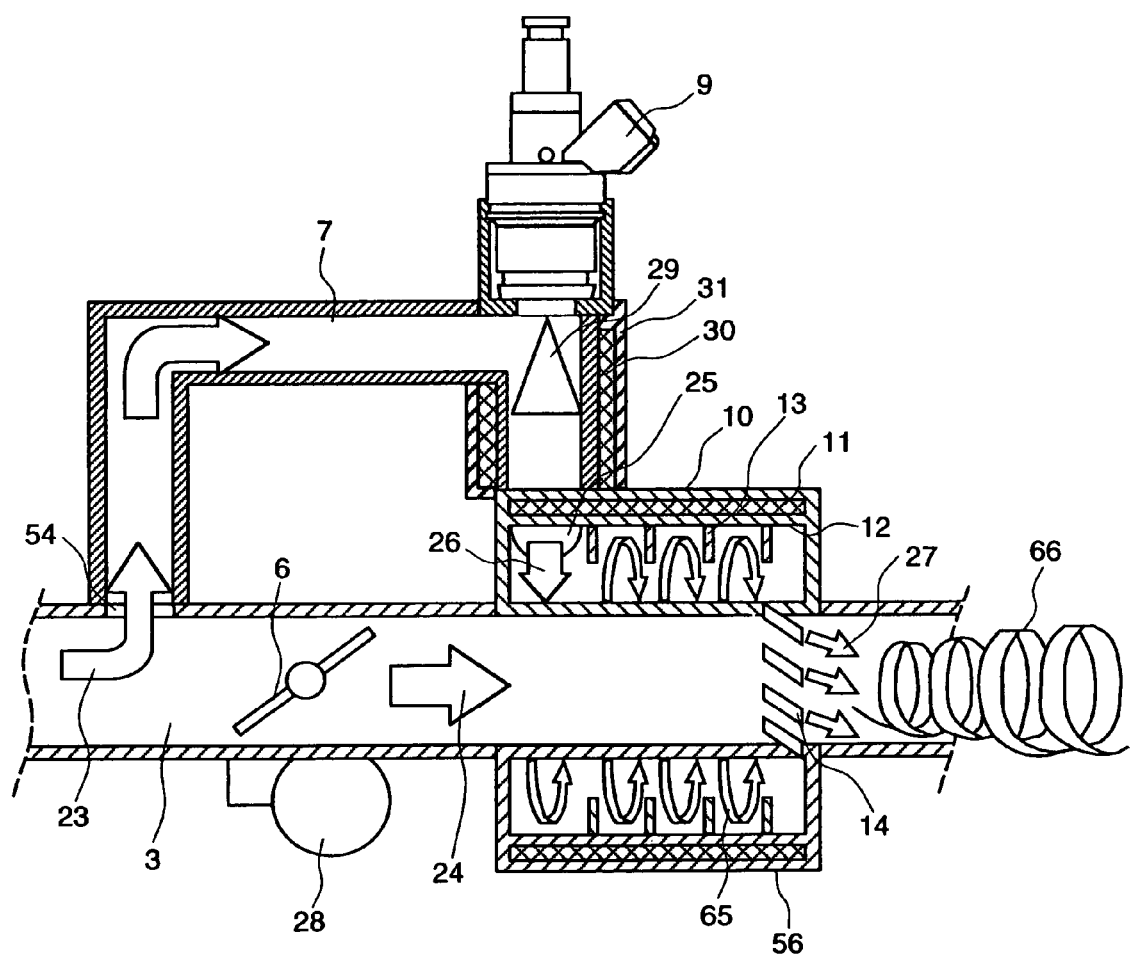
FIG. 2 shows an enlarged cross-sectional view of the A section in the engine exhaust gas treatment system shown in FIG. 1 according to the present invention.

FIG. 2 shows an enlarged view of the A section in FIG. 1. Referring to FIG. 2, the detailed configuration of the engine exhaust gas treatment system, exhaust gas flow, spray 29 injected from the urea solution injection valve 9, and mixed gas flow 26, 27 of exhaust gas 2 2 (FIG. 1), 23, 24 will be described.

The exhaust gas 22 emitted from the diesel engine 1 passes through the DPF 4. The open/close control of the exhaust flow control valve 6 downstream of the DPF 4 then flows the exhaust gas 22 into the diversion pipe 7 upstream of the exhaust flow control valve 6 via a diversion pipe inlet 54 and into the flue 3 downstream of the exhaust flow control valve 6. This can control the flow ratio of the each exhaust flow 23 and 24.

In the cold state at the startup of the diesel engine 1, the opening of the exhaust flow control valve 6 is controlled to flow more exhaust gas 24 into the flue 3. This can activate early the denitration catalyst 5 (FIG. 1) to ensure high denitration efficiency.

The catalyst is thus most preferentially heated to remove efficiently NOx. After the exhaust gas 24 activates the denitration catalyst 5, the diversion ratio of the each exhaust gases 23, 24 is preferably controlled to a predetermined value.

The diversion pipe 7 has the urea solution injection valve 9 that makes up a urea solution injection device. The urea solution injection valve 9 can control the urea solution injection amount depending on the engine operating conditions.

When the high temperatures exhaust gas 23 flows into the diversion pipe 7, the urea solution injection valve 9 injects the urea solution 8 as the spray 29.

The high temperature exhaust gas 23 and the droplets in the urea solution spray 29 mix together to exchange heat and help evaporate the spray 29. The exhaust gas 23 carries the urea solution spray 29 as the mixed gas 26 into the evaporation mixer 10 through the evaporation mixer inlet 25.

The heater 30 resides outside the diversion pipe 7 downstream of the urea solution injection valve 9 and is set at a predetermine d temperature or more. These can help evaporate the urea solution spray 29 and prevent the urea from being precipitated out of the urea solution spray 29 that adheres to the wall surface in the diversion pipe 7. The ammonia carbonate or the like is also prevented from occurring.

The evaporation mixer 10 has the evaporation mixer inlet 25 that is connected off center thereto by a predetermined distance from the center line of the flue cross section that is perpendicular to the flue axial flow direction of the evaporation mixer 10. Therefore, the exhaust gas 23 and urea solution spray 29 help mix and evaporation through the flue 7, and the mixed gas 26 forms a circling flow 65 in the evaporation mixer 10.

The circling flow 65 helps further mix the mixed gas 26 and allows the relatively heavy urea solution droplets in the mixed gas 26 that are not completely evaporated to actively adhere to the heating surface 12 that is the inner surface of the evaporation mixer 10. Restrictions in ring shapes reside with a predetermined height and a distance on the heating surface 12 inside the evaporation mixer 10 in the axial flow direction of the flue. The restrictions can form flow stagnation areas where the urea solution droplets can dwell.]

The heater 11 resides outside the evaporation mixer 10, the heat of which can help evaporate the urea solution droplet groups that actively adhere to and dwell on the heating surface 12 inside the evaporation mixer 10. The heating surface 12 is preferably set at about 300° C. The above-described configurations and mixed gas flow 26 can completely evaporate the urea solution spray 29 and highly efficiently hydrolyze the urea solution 8 into ammonia. The ammonia can thus be generated highly quickly.

The evaporation mixer 10 generates ammonia that is carried and supplied into the flue 3 through the evaporation mixer outlet 14. In this way, the evaporation mixer 10 can also act as a mixed gas carrier portion. More than one evaporation mixer outlet 14 resides off center from the centerline of the flue 3 cross section that is perpendicular to the flue 3 axial flow direction to allow the mixed gas 27 to form a circling flow 66 in the flue 3. The mixed gas 27 including a plenty of ammonia can thus form a circling flow 66 in the flue 3.

The circling flow 66 can help mix the exhaust gas 24 and mixed gas 27 to supply the ammonia in the mixed fluid 27 uniformly to the denitration catalyst 5. High denitration efficiency can thus be achieved to reduce effectively NOx emitted from the diesel engine 1.

The heat from the heaters 30 and 11 and the exhaust heat from the exhaust gases 23 and 24 can definitely hydrolyze the urea solution into ammonia with low power consumption, thereby reducing NOx at high denitration efficiency. The heating surface 12 of the evaporation mixer can transfer more heat to the urea solution droplets that dwell on the heating surface 12. This allows a compact evaporation mixer to completely hydrolyze the urea solution into the ammonia.

A urea decomposition catalyst preferably adheres to the heating surface 12 of the evaporation mixer 10. The urea decomposition catalyst can further improve the urea decomposition rate to improve the denitration efficiency on the denitration catalyst even in an early relatively low temperature atmosphere. The active ingredient of the urea decomposition catalyst is preferably a metal oxide or metal oxide composite.

In the operating area with relatively a smaller amount and lower temperatures of the exhaust gas 22 such as at the startup of the diesel engine 1, the heaters 30 and 11 can generate more heat to actively evaporate the urea solution. The exhaust flow control valve 6 is controlled to obtain the adequate flow of the exhaust gas 23 by adjusting the diversion ratio of the exhaust gas 24 flowing downstream of the exhaust flow control valve 6 and the exhaust gas 23 flowing into the diversion pipe 7.

The exhaust flow control valve 6 is also controlled to effectively use the exhaust heat from the exhaust gas 23 and to allow the urea solution droplets to adhere to the heating surface 12 of the evaporation mixer 10 to help evaporate the urea solution. Because smaller amount of NOx is generated in the above-described operating area, less urea solution is to be treated and the heaters can need the minimum required capacity and power consumption.

In the operating area with relatively a larger amount and higher temperatures of the exhaust gas 23, a plenty of NOx occurs and a plenty of urea solution needs to be evaporated. The exhaust flow control valve 6 is thus controlled to allow more exhaust gas 23 to flow into the diversion pipe 7. This can supply the urea solution spray 29 in a large quantity of the high temperature exhaust gas and help evaporate the urea solution spray 29 without increasing the heat from the heaters 30 and 11.

In this embodiment, the urea solution injection valve 9 is an upstream circling type injection valve that can atomize the urea solution spray 29 by circling the urea solution 8 upstream of the valve seat that is upstream of the injection holes 47 of the urea solution injection valve 9. But the injection valve 9 is not limited to this type of valve and may be any injection valve with a structure that can help atomize the urea solution 8. The injection valve 9 may thus be any injection valve of excellent evaporation performance that can help atomize the urea solution 8 injected from the injection valve to improve the evaporation performance of the urea solution 8.

With the above-described configurations and exhaust gas flows and the like, the diversion control of the flow ratio of the exhaust gases 23 and 24 by the exhaust flow control valve 6, the urea solution spray 29 injected from the urea solution injection valve 9 into the high temperature exhaust gas 23 flowing through the diversion pipe 7, and the stagnation area formed in the evaporation mixer 10 by the circling flow 65 and restrictions 13 can circle and mix the mixed gas 26 (including the exhaust gas 23, urea vapor, and water vapor) and ensure the dwell time and help evaporate the urea solution and facilitate the hydrolysis, in order to make it possible to generate the ammonia ($NH_3$) and carbon dioxide ($CO_2$).

The mix of the ammonia and exhaust gas is also facilitated. The mixed fluid 27 including ammonia and carbon dioxide is emitted from the evaporation mixer outlet 14. The mixed gas 27 is emitted into the flue 3 as the circling flow 6 to help mix with the exhaust gas 24 before being supplied onto the denitration catalyst 5. The ammonia can thus be uniformly supplied onto the denitration catalyst 5.

Consequently, the urea solution 8 injected as the reducing agent can be hydrolyzed efficiently and the ammonia generated can be dispersed uniformly (without any drift and uniformized) into the exhaust gas 24 to effectively reduce and remove NOx in the exhaust gas 22 on the denitration catalyst 5.

In the above embodiment, the diversion pipe 7 resides outside the flue 3 independently or integrally. The diversion pipe (diversion passage) may also reside inside the flue 3. This can provide a more compact structure.

The second embodiment according to the present invention will now be described with reference to FIGS. 3 to 6.

Figure 3:
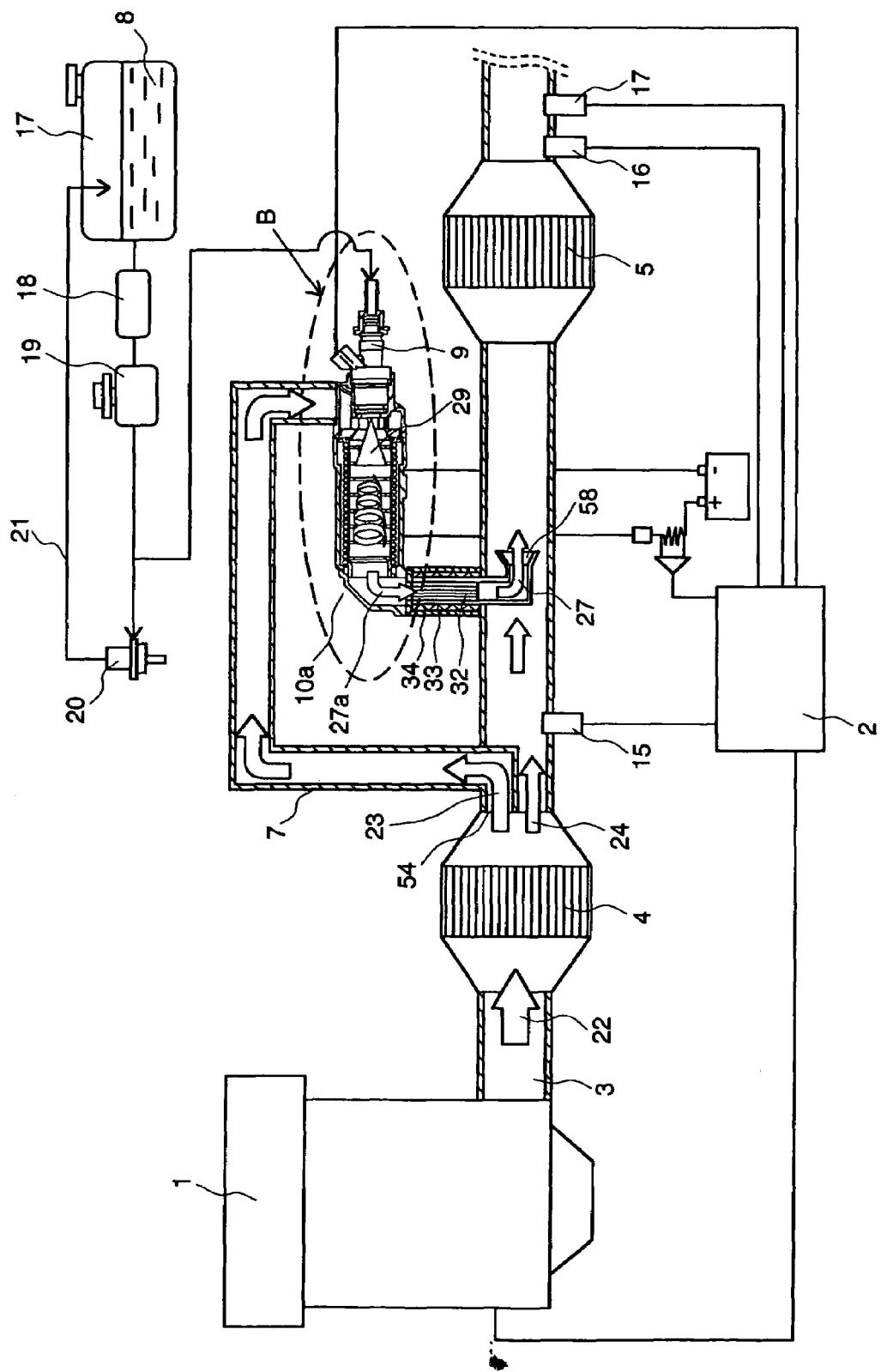
FIG. 3 shows an engine exhaust gas treatment system of the second embodiment according to the present invention.

FIG. 3 shows the overall configuration of the exhaust gas treatment system of an embodiment according to the present invention. This embodiment differs from the above described first embodiment mainly in the mounting position at which the diversion pipe inlet 54, configuration of the evaporation mixer 10a, and configuration of the mixed gas outlet 14.

This embodiment does not provide the exhaust flow control valve 6 that is provided in the first embodiment. The diversion pipe inlet mounting structure and diversion pipe 7 can thus make up the exhaust gas diversion means. Other configurations are the same as in the first embodiment, so their description is omitted here.

In this embodiment, the diversion pipe inlet 54 opens in a part of the flue 3 in countercurrent with the flow direction of the exhaust gas 22 to divert the exhaust gas 22 from the diesel engine 1 into the flue 3 and diversion pipe 7. This can split the exhaust gas 22 into the exhaust gas 23 flowing into the diversion pipe 7 and the exhaust gas 24 flowing into the flue 3 downstream of the diversion pipe inlet 54.

Figure 4:
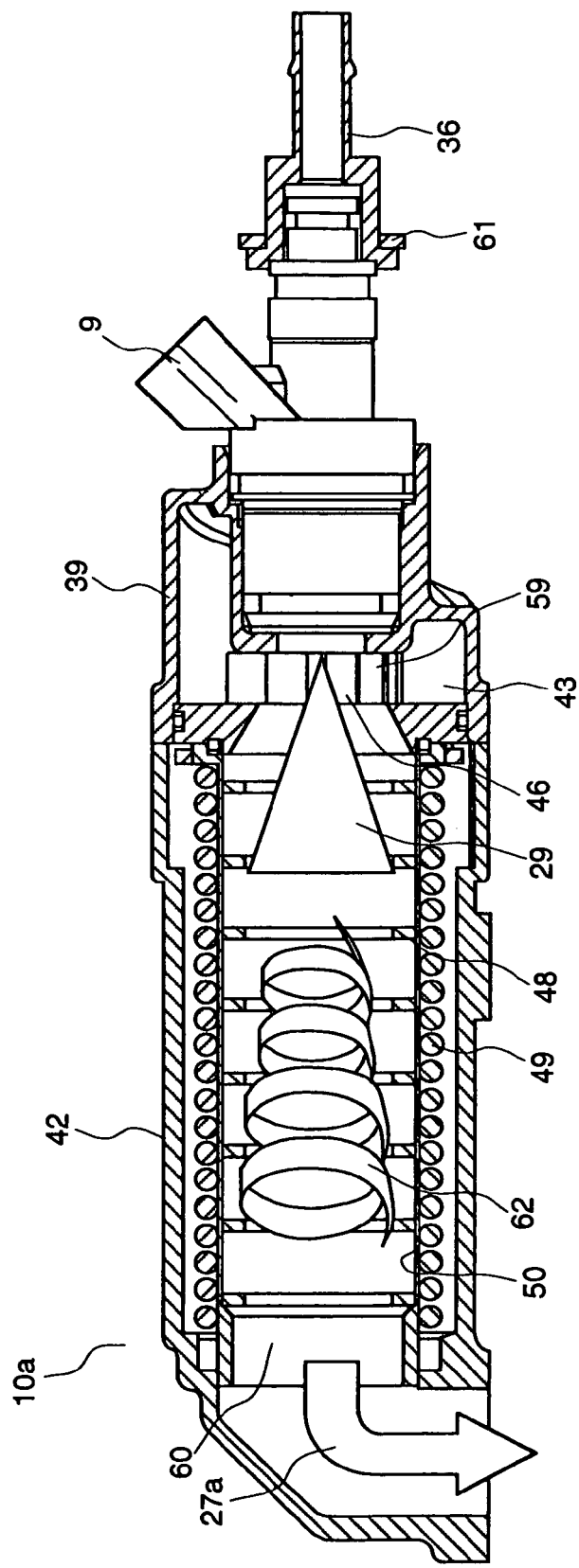
FIG. 4 shows a cross-sectional view taken along line E-E of the exhaust gas treatment system shown in FIG. 5(b) according to the present invention, which is also an enlarged view of the B section in FIG. 3.

FIG. 4 shows an enlarged view of the B section in FIG. 3. In FIGS. 3 and 4, the flue 3 and diversion pipe 7 communicate with each other through the diversion pipe inlet 54, and the evaporation mixer 10a communicates with the diversion pipe 7. The urea solution injection valve 9, heater 49 as a heating element, and more than one ring shaped restriction 48 on the heating surface 50 reside on the evaporation mixer 10a.

A urea decomposition catalyst 32 in a honeycomb shape resides downstream of the evaporation mixer 10a. The urea decomposition catalyst 32 is not limited to the honeycomb shape, and apart from the honeycomb shape, may be a plate-like parallel flow type, and a granular type. The heater 33 also resides outside the passage that contains the urea decomposition catalyst 32. The heater 33 can keep the temperature of the passage above a predetermined value and can early warm up the urea decomposition catalyst 32 to early activate it.

The thermal insulation member 34 resides outside the heater 33 for thermal insulation. These can prevent the urea from being precipitated out of the urea solution spray 29 that adheres to the passage wall surface downstream of the evaporation mixer 10a. The ammonia carbonate or the like is also prevented from occurring.

Downstream of the urea decomposition catalyst 32, the mixed gas outlet 58 resides in the flue 3. The above-described configurations can provide communication from the diversion pipe inlet 54 through the evaporation mixer 10a, urea decomposition catalyst 32, and mixed gas outlet 58 into the flue 3. The mixed gas outlet 58 has a bell mouth shape that can disperse and supply the mixed fluid 27 into the flue 3.

The heater body 42 contains a sub passage 60. A heater 49 such as a sheathed heater resides outside the sub passage 60. The present embodiment uses the sheathed heater for the heater 49, but the heater 49 is not limited thereto. Other heaters such as a plate—like PTC (Positive Temperature Coefficient Thermistor) heater may be used. The PTC heater has upper and lower flat surfaces as electrodes. The upper and lower electrodes through which current passes can heat up.

The PTC is a ceramic heater that at temperatures greater than or equal to a predetermined value can rapidly increase its resistance to decrease the current through it and thus keep the constant temperature.

More than one restriction 48 is press fitted and fastened into the sub passage 60 at a predetermined distance along the passage axial flow direction.

The body 39 has the urea solution injection valve 9 that is coaxial with the heater body 42. The urea solution pipe 36 and urea solution pipe holder 61 fasten the urea solution injection valve 9 onto the body 39. The injection holes 47 of the urea solution injection valve 9 reside in the mixing chamber 46.

The urea solution spray 29 injected from the urea solution injection valve 9 is thus supplied into the mixing chamber 46 and also into the sub passage 60 downstream thereof.

The exhaust gas 23 flows into the diversion pipe 7 through the diversion pipe inlet 54 and then flows into the evaporation mixer 10a downstream of the diversion pipe 7. The exhaust heat from the exhaust gas 23 that flows into the evaporation mixer 10a and the heat from the heater 49 can evaporate the urea solution spray 29 injected from the urea solution injection valve 9 into the urea vapor and water vapor and then hydrolyze the urea vapor into ammonia. The mixed gas 27a of the exhaust gas 23 and ammonia can thus be generated.

Urea not decomposed into ammonia in the evaporation mixer 10a is completely hydrolyzed into ammonia on the urea decomposition catalyst 32 downstream of the evaporation mixer 10a. The evaporation mixer outlet 58 can thus supply into the flue 3 the ammonia from the urea spray 29 completely hydrolyzed. The mixed fluid 27 supplied into flue 3 can help mix with the exhaust gas 24 and be dispersed and supplied uniformly onto the denitration catalyst 5 and effectively reduce and remove NOx in the exhaust gas on the denitration catalyst 5. NOx removed is then exhausted.

Figure 5A:
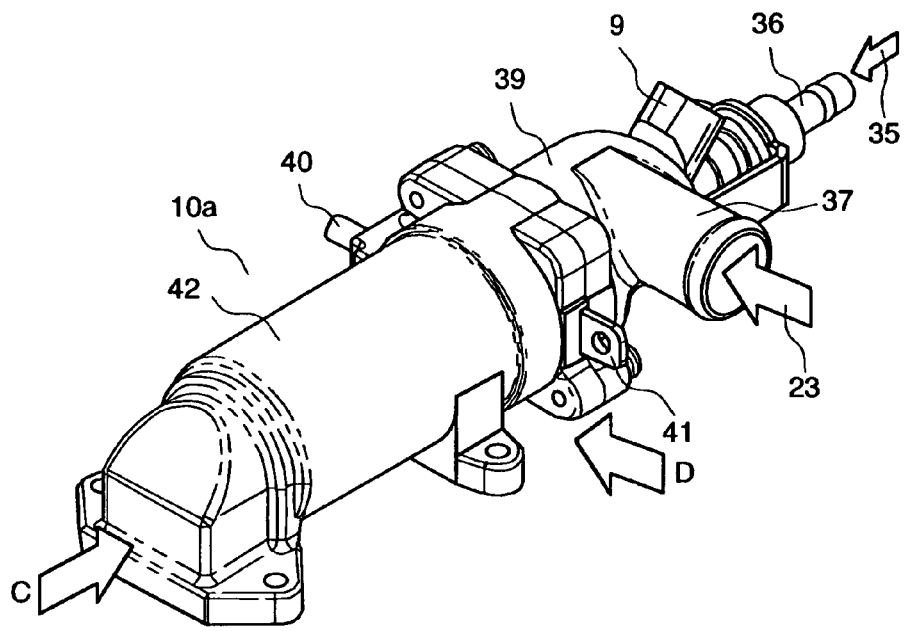
FIG. 5 shows (a) a perspective view, (b) a front view, and (c) a side view of the exhaust gas treatment system shown in FIG. 3 according to the present invention.
Figure 5B:
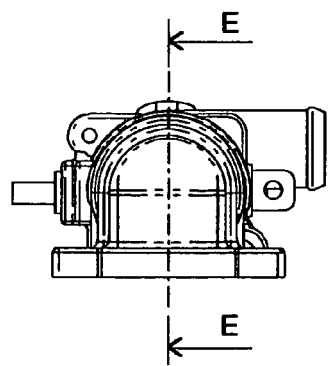

FIG. 5(a) shows a perspective view of the B section in FIG. 3. FIGS. 5(b) and (c) show perspective views as viewed in the direction of the arrows C and D in FIG. 5(a). FIG. 6 shows a cross-sectional view taken along line F-F in FIG. 5(c). FIG. 4 shows a cross-sectional view taken along line E-E in FIG. 5(b).

Figure 5C:
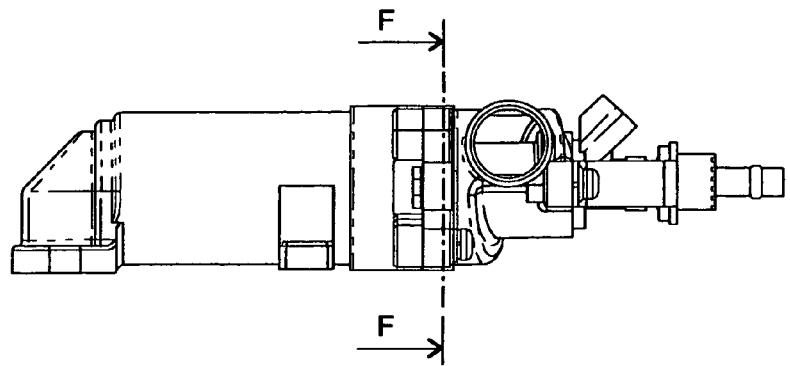
Figure 6:
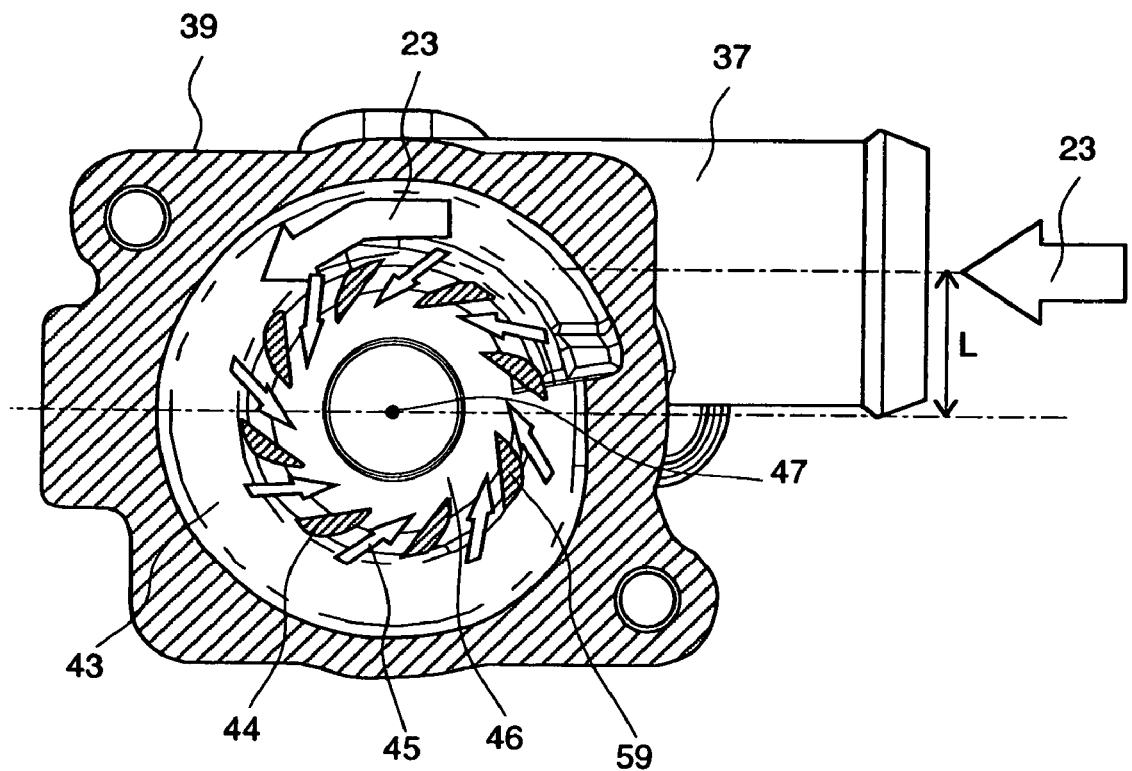
FIG. 6 shows a cross-sectional view taken along line F-F of the exhaust gas treatment system shown in FIG. 5(c) according to the present invention.

FIG. 6 shows a cross-sectional view of the body 39 of the evaporation mixer 10a taken along line F-F in FIG. 5(c). The body 39 has an exhaust gas introduction pipe 37, which communicates with a regulator chamber 43 in the body 39. The regulator chamber 43 contains a circling nozzle 59. The exhaust gas introduction pipe 37 is arranged offset by a distance L from the central axis of the cross section of the regulator chamber 43 of the figure. The exhaust gas 23 is thus introduced, after passing through the exhaust gas introduction pipe 37, at a position offset from the central axis of the cross section of the regulator chamber 43.

The circling nozzle 59 includes more than one fin 44 with a wing-shaped cross section, which is formed circumferentially therein at regular intervals. Passages formed between each fin 44 have a larger cross section on the exhaust gas 23 inlet side and a smaller cross section on the outlet side. The cross section of the regulator chamber 43 is a swirl shape that gradually decreases in size with distance downstream in such a way that the exhaust gas flow 45 through each fin 44 can have a constant flow rate.

The swirl shape is a structure that can employ a swirl structure in a limited space for a constant external diameter of the regulator chamber 43 and for a gradually smaller cross section perpendicular to the axial flow direction of the urea solution injection.

A mixing chamber 46 resides inside the cross section of the circling nozzle 59 of the figure. Upstream of the mixing chamber 46, the urea solution injection valve 9 resides.

A description is now given of the fluid flow emitted from the internal combustion engine 1 with the above-described evaporation mixer 10a. In this embodiment, the operation of the diesel engine 1 can flow the exhaust gas 22 into the flue 3. This can flow the exhaust gas 23 into the diversion pipe 7 and the exhaust gas introduction pipe 37 and into the evaporation mixer 10a. The urea solution sp ray 29 injected from the urea solution injection valve 9 in the evaporation mixer 10a is supplied into the mixing chamber 46 downstream of the injection holes 47.

The exhaust gas 23 diverted at the diversion pipe 7 is supplied into the mixing chamber 46 from the exhaust gas introduction pipe 37 through between each fin 44 formed in the circling nozzle 59 at a constant flow rate as the exhaust gas flow 45. The exhaust gas flow 45 supplied into the mixing chamber 46 provides a circling flow 62 of the exhaust gas in the mixing chamber 46. The combination of the urea solution spray 29 and circling flow 62 can supply the urea solution spray 29 circumferentially and nearly uniformly on the heating surface 50.

The urea solution spray 29 supplied on the heating surface 50, as the urea solution spray (droplets) on the heating surface 50, moves along the circling flow 62 by circling on the heating surface 50 of the sub passage 60 downstream of the mixing chamber 46. Restrictions 48 reside on the heating surface 50 of the sub passage 60. The step between the internal diameters of the heating surface 50 and restriction 48 can allow a predetermined amount of the urea solution spray (droplets) 29 to dwell on the heating surface 50 to help evaporate the urea solution spray.

In the evaporation mixer 10a with the restrictions 48, the urea solution spray (droplets) 29 can move downstream in the axial flow direction along the exhaust gas circling flow 62 by circling on the cylindrical heating surface 50 of the sub passage 60. The exhaust gas circling flow 62 and urea solution spray (droplets) 29 have velocity components in the axial flow direction and in the circling direction.

The restrictions 48 on the heating surface 50 of the sub passage 60 can convert the velocity component in the axial flow direction of the urea solution spray (droplets) 20 moving on the heating surface 50 to the velocity component in the circling direction. In other words, the velocity component in the axial flow direction decreases and the velocity component in the circling direction increases.

This can increase the number of circling of the exhaust gas circling flow 62 and urea solution spray (droplets) flowing along the flow 62 and can extremely increase the dwell time of the urea solution spray (droplets) on the heating surface 50. The restrictions 48 can change the cross-section area of the sub passage 60 perpendicular to the axial flow to form the stagnation area where the urea solution spray (droplets) 29 can dwell.

The effect of the restrictions 48 of this embodiment will now be described. The restrictions 48 in the sub passage 60 can help evaporate the urea solution spray (droplets) 29 supplied from the urea solution injection valve 9 and prevent the urea solution liquid flow from occurring outside the evaporation mixer 10a.

In other words, the urea solution spray (droplets) 29 can dwell on the heating surface 50 for an extended time to evaporate more urea solution. Specifically, the extended dwell time can cause the evaporation of the same amount of the urea solution with less heating capacity, thereby providing a compact evaporation mixer 10a.

In addition, the denitration catalyst 5 can effectively reduce and remove NOx in the exhaust gas 22 as in the first embodiment.

Figure 7:
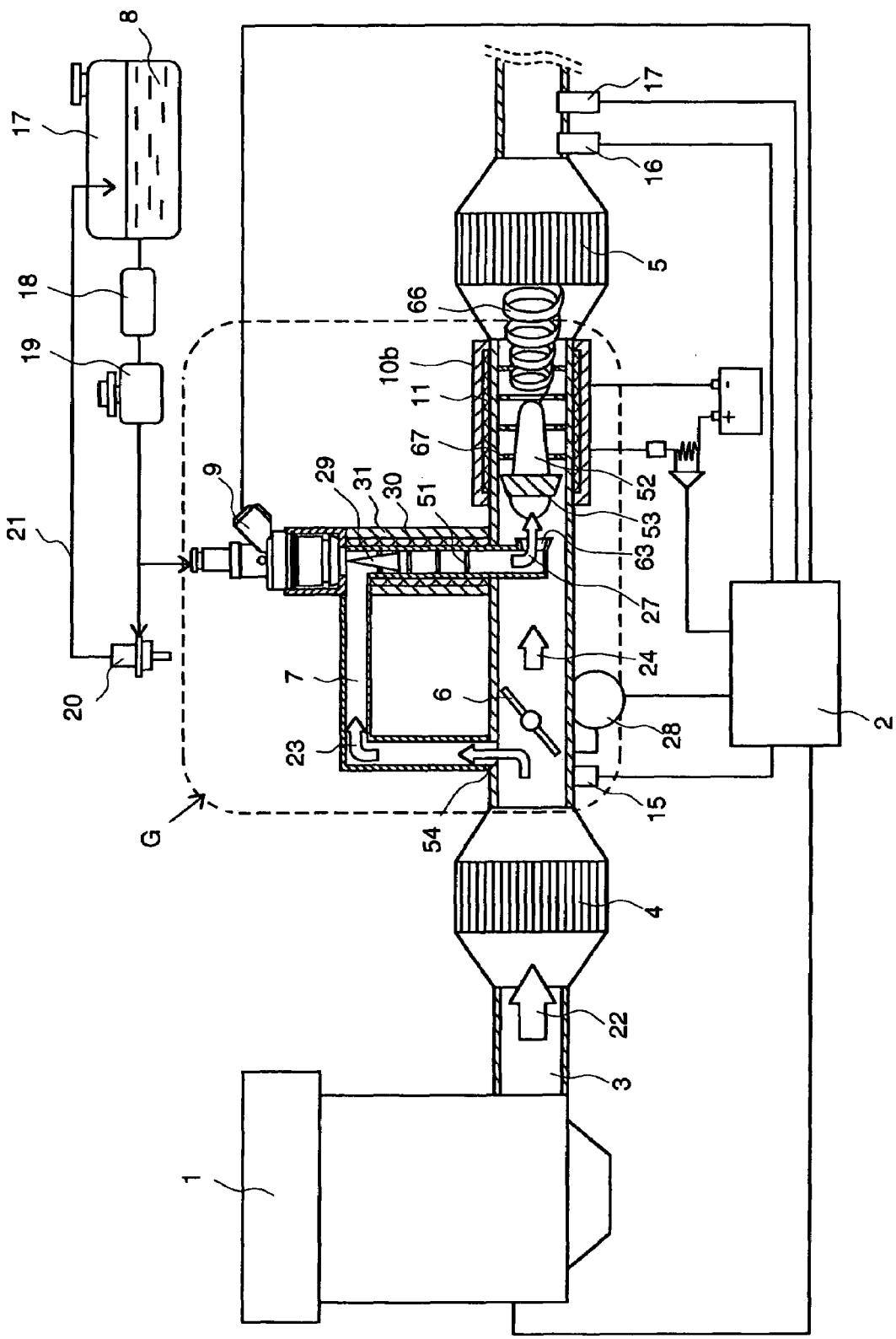
FIG. 7 shows an engine exhaust gas treatment system of the third embodiment according to the present invention.
Figure 8:
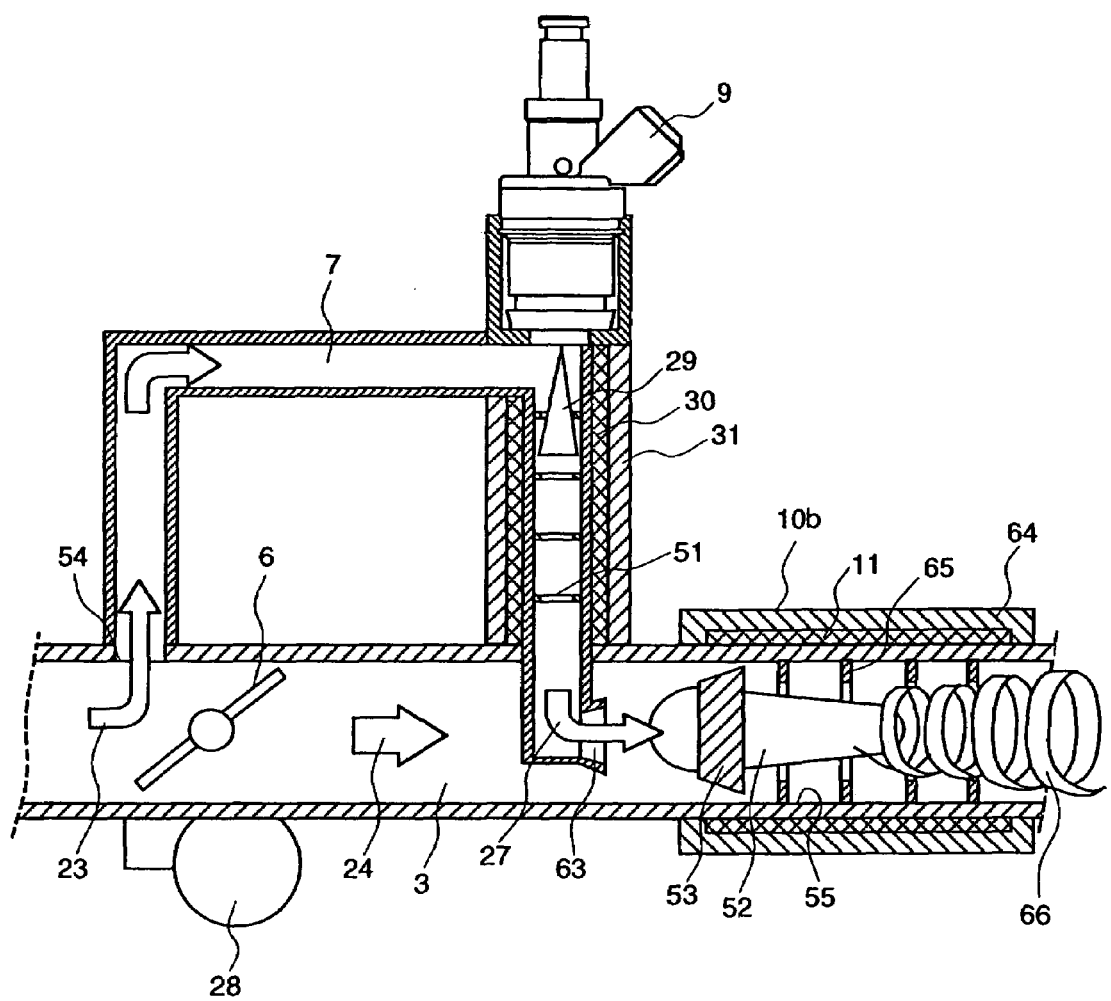
FIG. 8 shows an enlarged cross-sectional view of the G section in the engine exhaust gas treatment system shown in FIG. 7 according to the present invention.

The third embodiment according to the present invention will now be described with reference to FIGS. 7 and 8. FIG. 7 shows the overall configuration of the exhaust gas treatment system of an embodiment according to the present invention. FIG. 8 shows an enlarged view of the G section in FIG. 7.

This embodiment differs from the first embodiment mainly in the configuration of the evaporation mixer 10a, and configuration of the diversion pipe 7 downstream of the urea solution injection valve 9. Other configurations are the same as in the first embodiment, so their description is omitted here.

This embodiment provides a ring shaped restriction 51 in the diversion pipe 7 downstream of the urea solution injection valve 9. The heater 30 resides outside the diversion pipe 7 downstream of the urea solution injection valve 9 as in the first embodiment. The thermal insulation member 31 resides outside the heater 30 for improving the thermal insulation to the ambient air.

The diversion pipe 7 has the diversion pipe outlet 63 that opens in the flue 3 downstream of the diversion control valve 6. The diversion pipe outlet 63 has a bell mouth shape that can disperse and supply the mixed fluid 27 into the flue 3. The flue 3 downstream of the diversion pipe 63 contains a circling member 52 with a wing 53 for helping mix the fluid in the flue 3 and allowing the urea solution droplets to adhere on the heating surface that is the inner surface of the flue 3 (described below).

In addition, the heater 11 as a heating element resides outside the flue 3 downstream of the vicinity of the wing 53 as in FIG. 2. The heater 11 can heat the heating surface 55 that is the wall surface in the flue 3. The thermal insulation member 64 resides outside the heater 11 for improving the thermal insulation to the ambient air. Ring shaped restrictions 67 reside on the heating surface 55 at a predetermined distance along the axial flow direction of the flue 3.

A description is now given of the fluid flow emitted from the internal combustion engine 1 of the above-described configuration. The high temperature exhaust gas 23 flows into the diversion pipe 7. The urea solution injection valve 9 injects the urea solution spray 29 into the exhaust gas 23 to help evaporate the urea solution. The heater 30 downstream of the urea solution injection valve 9 can further help evaporate the urea solution by its heat.

The restrictions 51 in the diversion pipe 7 can allow the mixed fluid flow of the exhaust gas 23 and urea solution spray 29 to form stagnation areas upstream and downstream of the restrictions 51 and dwell there. This can supply heat to the mixed fluid more effectively to help evaporate the fluid. This can help hydrolysis to generate a mixed fluid 27 including ammonia decomposed from the urea. The mixed fluid 27 is then emitted from the diversion pipe outlet 63 downstream.

The diversion pipe outlet 63 has a bell mouth shape that can disperse and supply the mixed fluid 27 upstream of the circling member 52 in the flue 3. The wing 52 of the circling member 53 can change the mixed fluid 27 supplied upstream of the circling member 52 to a circling flow 66 downstream of the circling member 52. The circling flow 66 can allow relatively heavy things such as the residual urea solution droplets in the mixed fluid 27 to adhere to the heating surface 55 in the flue 3.

In addition, more than one restriction 13 on the heating surface 55 along the axial flow direction of the flue can allow the mixed fluid 27 to form stagnation areas upstream and downstream of the restrictions 13 and dwell there. This can help evaporate and hydrolyze completely the residual urea solution droplets in the mixed fluid 27 into ammonia. In this way, the urea solution spray 29 injected from the urea solution injection valve 9 can be completely hydrolyze d into ammonia.

Further, the mixed fluid 27 can form on the heating surface 55 in the flue 3 the circling flow 66 that can help mix the fluid 27 with the exhaust gas 24 and supply the fluid 27 uniformly on the denitration catalyst 5. The denitration catalyst 5 can thus effectively reduce and remove NOx in the exhaust gas 22.

A urea decomposition catalyst preferably adheres to the heating surface 55 of the evaporation mixer 10a. The urea decomposition catalyst can further improve the urea decomposition rat e to improve the denitration efficiency on the denitration catalyst even in a relatively low temperature atmosphere. The active ingredient of the urea decomposition catalyst is preferably a metal oxide or metal oxide composite.

As described above, an exhaust gas treatment system is provided in which an exhaust gas is introduced into a denitration catalyst reactor 5 provided in an exhaust gas flue 3, where nitrogen oxide is reduced in the presence of the denitration catalyst, comprising: an exhaust gas diversion passage portion such as a diversion pipe 7 provided in the exhaust gas flue 3; a urea solution injection valve 9 or a liquid reducing agent injection device, which is provided in the exhaust gas diversion passage portion 7 and in which part or all of the exhaust gas 23 is introduced, for injecting a urea solution into the exhaust gas introduced, or for injecting a liquid reducing agent into the exhaust gas introduced, respectively; an ammonia generation portion, which has heating means by heaters 30 and 11, for decomposing particulate droplets of the urea solution or liquid reducing agent, and the urea or liquid reducing agent, to generate ammonia by one or both of heat from the exhaust gas and heat from the heater; a mixing portion such as an evaporation mixer 10 for mixing the generated ammonia with the exhaust gas; and the denitration catalyst reactor 5 in which a mixed gas of the ammonia and exhaust gas is introduced.

In addition, an exhaust gas treatment system is provided in which an exhaust gas is introduced into a denitration catalyst reactor 5 provided in an exhaust gas flue 3, where nitrogen oxide is reduced in the presence of the denitration catalyst, comprising: a urea solution injection valve 9 for injecting a urea solution into the exhaust gas introduced from the exhaust gas flue 3; an ammonia generation portion, which has heating means by a heater 30, for decomposing particulate droplets of the urea solution and urea to generate ammonia by at least heat of the above-described heater; a mixed gas carrier portion, which has another heating means by a heater 11, for decomposing particulate droplets of a residual urea solution and urea, and for mixing the generated ammonia with the exhaust gas, and for carrying the mixed gas; and the denitration catalyst reactor 5 in which the mixed gas of the heated ammonia and exhaust gas is introduced.

The exhaust gas diversion passage portion 7 may comprise an exhaust flow control valve 6 which changes a diversion amount of the exhaust gas into the urea solution injection valve 9 depending on output from part or all of an exhaust gas temperature sensor, an exhaust gas flow rate sensor, and a nitrogen oxide sensor.

The above-described mixing portion may be provided in the exhaust gas diversion passage portion 7.

The above-described mixing portion may be provided in the exhaust gas flue 3.

The above-described ammonia generation portion comprises a urea decomposition catalyst reactor.

A urea solution injection device including the urea solution injection valve 9 may be provided, wherein the above-described urea solution injection device may comprise a urea solution injection amount control device which changes an amount of the injected urea solution depending on output from part or all of an exhaust gas temperature sensor, an exhaust gas flow rate sensor, and a nitrogen oxide sensor.

A heater temperature control device may be provided which changes an amount of heat generated depending on output from part or all of an exhaust gas temperature sensor, an exhaust gas flow rate sensor, and a nitrogen oxide sensor.

The above-described heater temperature control device may comprise a heat amount change pattern for changing the amount of heat generated according to a previously stored heat generation pattern depending on an engine operating condition.

The above-described heat amount change pattern is that a smaller amount of heat is generated for higher temperatures and a greater flow rate of the exhaust gas.

For example, a circling means mixes the particulate droplets of t he urea solution and ammonia with the exhaust gas.

Further, an exhaust gas treatment system is provided in which an exhaust gas is introduced into a denitration catalyst reactor 5 provided in an exhaust gas flue 3, where nitrogen oxide is reduced in the presence of the denitration catalyst, comprising: a urea solution injection valve 9 for injecting a urea solution into part of the exhaust gas 23 introduced from the exhaust gas flue 3; a first ammonia generation portion, which has a heating means by a heater 30, for decomposing particulate droplets of the urea solution and urea to generate ammonia by at least heat of the heater 30; a second ammonia generation portion, which has another heating means by a heater 11, for decomposing particulate droplets of a residual urea solution and urea to generate ammonia; a mixed gas carrier portion for mixing the generated ammonia with the exhaust gas by a circling means, and for carrying the mixed gas of the heated ammonia and exhaust gas with allowing its temporal dwelling between a plurality of restrictions 13 and 67; and the denitration catalyst reactor 5 in which the above-described mixed gas is introduced.

EFFECTS OF THE INVENTION

According to the present invention, an exhaust gas diversion means is mounted, and a heating element such as a heater is positively used to help evaporate a liquid reducing agent such as a urea solution for lower temperatures and a smaller amount of the exhaust gas, such as at the startup of the engine. The exhaust heat is positively used to help evaporate the urea solution for higher temperatures and a larger amount of the exhaust gas, such as at a high-load engine area.

The exhaust gas 23 and urea solution spray 29 are circled and mixed and more than one restriction is mounted in a passage downstream of the urea solution injection valve 9 to allow the urea solution spray 29 to dwell and to help evaporate it.

An exhaust gas treatment system and exhaust gas treatment process are thus provided that can efficiently remove the nitrogen oxide (NOx) in the exhaust gas in the whole operating area from the engine start up area to the full load area. An exhaust gas treatment system and exhaust gas treatment process are also provided that can achieve the compact structure and low power consumption.

What is claimed is:

1. An exhaust gas treatment system in which a nitrogen oxide in an exhaust gas is reduced, comprising:
    an exhaust gas flue into which said exhaust gas is introduced;
    an exhaust gas diversion passage portion provided in said exhaust gas flue and in which at least part of said exhaust gas is introduced from the exhaust gas flue;
    a urea solution injection valve, which is provided in said exhaust gas diversion passage portion, for injecting a urea solution into said introduced exhaust gas, which is introduced into said exhaust gas diversion passage portion;
    a heating portion, which is provided at an outer periphery of said exhaust gas diversion passage portion, for heating said urea solution, which is injected from said urea solution injection valve;
    an ammonia generation portion for generating an ammonia by decomposing particulate droplets of said urea solution, which is heated by said heating portion and said ammonia;
    a mixing portion for mixing said ammonia generated in said ammonia generation portion with said exhaust gas; and
    a denitration catalyst reactor, to which said ammonia and said exhaust gas are introduced after being mixed in said mixing portion.

2. An exhaust gas treatment system according to claim 1, wherein said exhaust gas diversion passage portion comprises an exhaust flow control valve which changes a diversion amount of the exhaust gas into the urea solution injection valve depending on output from part or all of an exhaust gas temperature sensor, an exhaust gas flow rate sensor, and a nitrogen oxide sensor.

3. An exhaust gas treatment system according to claim 1, wherein said mixing portion is provided in said exhaust gas diversion passage portion.

4. An exhaust gas treatment system according to claim 1, wherein said mixing portion is provided in said exhaust gas flue.

5. An exhaust gas treatment system according to claim 1, wherein said ammonia generation portion comprises a urea decomposition catalyst reactor.

6. An exhaust gas treatment system according to claim 1, further comprising a urea solution injection device including said urea solution injection valve, wherein said urea solution injection device comprises a urea solution injection amount control device which changes an amount of the injected urea solution depending on output from part or all of an exhaust gas temperature sensor, an exhaust gas flow rate sensor, and a nitrogen oxide sensor.

7. An exhaust gas treatment system according to claim 1, wherein circling means mixes the particulate droplets of the urea solution and ammonia with the exhaust gas.

8. An exhaust gas treatment system according to claim 1, comprising a heater temperature control device which changes an amount of heat generated depending on output from part or all of an exhaust gas temperature sensor, an exhaust gas flow rate sensor, and a nitrogen oxide sensor.

9. An exhaust gas treatment system according to claim 8, said heater temperature control device comprises a heat amount change pattern for changing the amount of heat generated according to a previously stored heat generation pattern depending on an engine operating condition.

10. An exhaust gas treatment system according to claim 9, said heat amount change pattern is that a smaller amount of heat is generated for higher temperatures and a greater flow rate of the exhaust gas.

* * * * *